United States Patent
Becker et al.

(10) Patent No.: US 10,981,481 B2
(45) Date of Patent: Apr. 20, 2021

(54) SHELF ARRANGEMENT FOR A VEHICLE

(71) Applicant: Brose Fahrzeugteile GmbH & Co. Kommanditgesellschaft, Coburg, Coburg (DE)

(72) Inventors: Lucas Becker, Berlin (DE); Johannes Merk, Berlin (DE); Tobias Baumann, Berlin (DE); Philipp Franz Blum, Berlin (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 0 days.

(21) Appl. No.: 16/483,851

(22) PCT Filed: Jan. 29, 2018

(86) PCT No.: PCT/EP2018/052060
§ 371 (c)(1),
(2) Date: Sep. 23, 2019

(87) PCT Pub. No.: WO2018/149623
PCT Pub. Date: Aug. 23, 2018

(65) Prior Publication Data
US 2020/0010004 A1    Jan. 9, 2020

(30) Foreign Application Priority Data

Feb. 17, 2017 (DE) .......................... 10 2017 202 625
Jul. 6, 2017 (DE) .......................... 10 2017 211 572

(51) Int. Cl.
*B60N 3/00* (2006.01)
*A47B 1/06* (2006.01)

(52) U.S. Cl.
CPC ................ *B60N 3/002* (2013.01); *A47B 1/06* (2013.01)

(58) Field of Classification Search
CPC .... A47B 1/06; A47B 3/04; A47B 3/05; A47B 2220/0077; A47B 3/06; B60N 3/002; B60N 3/004
(Continued)

(56) References Cited

U.S. PATENT DOCUMENTS 333,341 A * 12/1885 Schmitt .................... A47B 1/06
                                                     108/68
457,429 A *  8/1891 Pickety .................... A47B 1/06
                                                     108/68
(Continued)

FOREIGN PATENT DOCUMENTS

DE    19516011 C1    8/1996
DE    69603063 T2   12/1999
(Continued)

*Primary Examiner* — Jose V Chen
(74) *Attorney, Agent, or Firm* — Brooks Kushman, P.C.

(57) ABSTRACT

A shelf arrangement for a vehicle, which shelf arrangement forms a shelf surface and can be adjusted relative to a vehicle subassembly. The shelf arrangement has a plurality of slat elements, which are accommodated on the vehicle subassembly in a retracted position and can be pivoted toward each other for this purpose, wherein the slat elements are movable along a direction of movement relative to the vehicle subassembly in order to transfer the slat elements from the retracted position to an extended position, in which the slat elements are supported on one another in such a way that the slat elements form the shelf surface. In this way, a shelf arrangement for a vehicle is provided, which shelf arrangement can be used in an overall space-saving manner, in particular in the area of a dashboard of a vehicle.

22 Claims, 14 Drawing Sheets

(58) Field of Classification Search
USPC ........................................ 108/44, 45, 67, 68
See application file for complete search history.

(56) References Cited

U.S. PATENT DOCUMENTS

| | | | | | |
|---|---|---|---|---|---|
| 711,042 | A | * | 10/1902 | Dusenbery | A47B 1/06 108/68 |
| 835,790 | A | * | 11/1906 | Holm | A47B 1/06 108/68 |
| 868,423 | A | * | 10/1907 | Fuller | A47B 1/06 108/68 |
| 2,588,706 | A | * | 3/1952 | Davis | B60N 3/002 108/45 |
| 2,726,911 | A | * | 12/1955 | Mason | A47B 1/06 108/93 |
| 4,718,354 | A | * | 1/1988 | Piretti | A47B 1/06 108/143 |
| 5,884,566 | A | * | 3/1999 | Chen | A47B 13/08 108/67 |
| 8,327,774 | B1 | * | 12/2012 | Rivera | B60N 3/005 108/44 |
| 8,579,151 | B2 | * | 11/2013 | Kodama | B65D 43/20 220/812 |
| 2005/0076814 | A1 | * | 4/2005 | Madden | A47G 23/0303 108/44 |
| 2012/0133254 | A1 | * | 5/2012 | Chupp | A47B 1/06 312/205 |
| 2015/0092397 | A1 | * | 4/2015 | Liu | F21V 23/045 362/127 |
| 2018/0177298 | A1 | * | 6/2018 | Farahani | A47B 23/02 |
| 2019/0191894 | A1 | * | 6/2019 | Xu | A47B 96/021 |

FOREIGN PATENT DOCUMENTS

| | | |
|---|---|---|
| DE | 102007036439 A1 | 5/2009 |
| DE | 102010028787 A1 | 11/2011 |
| DE | 102011056355 A1 | 6/2013 |
| DE | 102017203443 A1 | 9/2018 |
| GB | 2538823 A | 11/2016 |

* cited by examiner

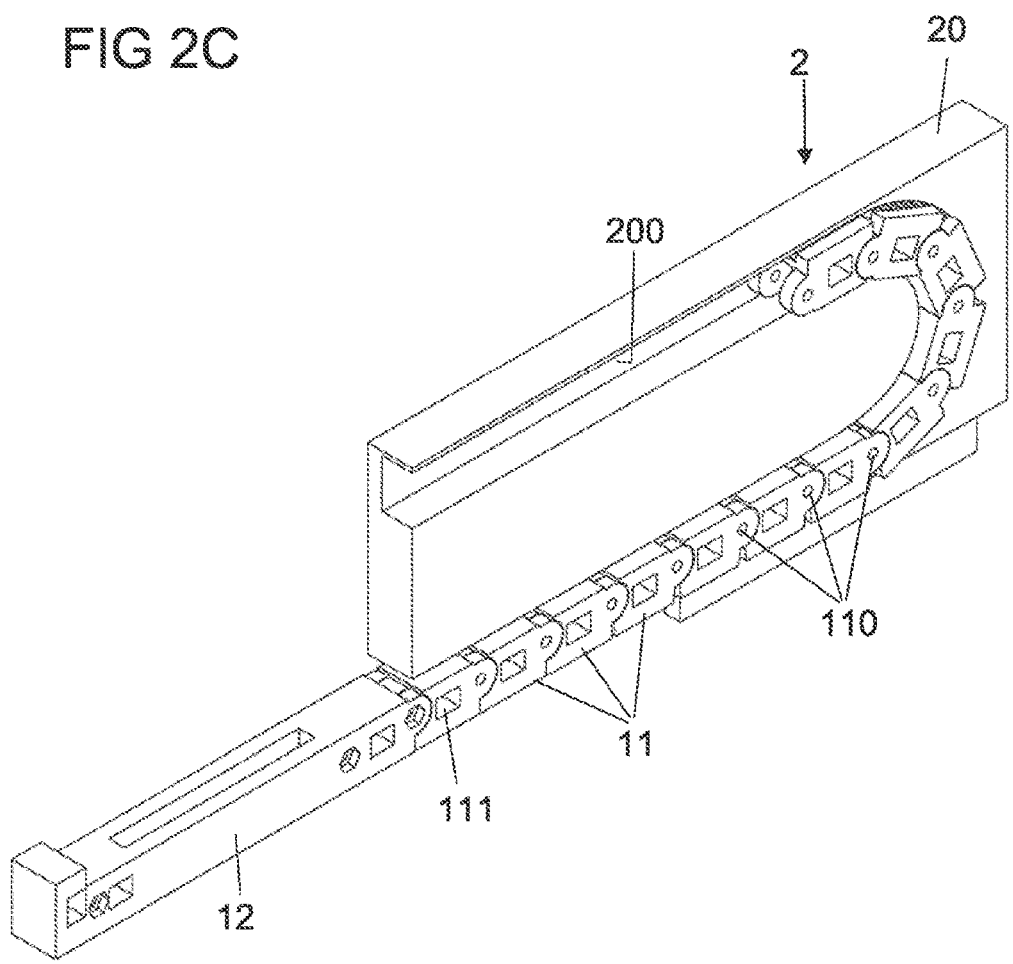

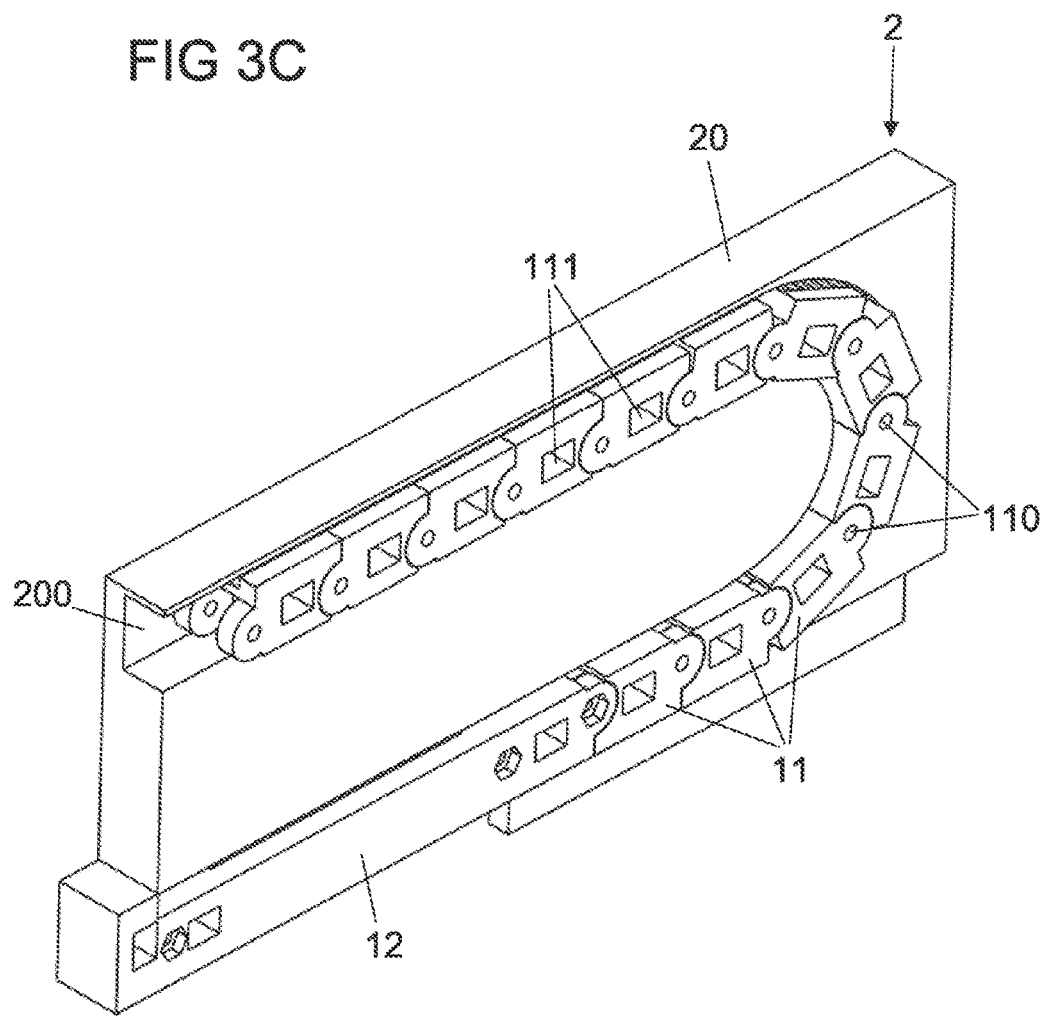

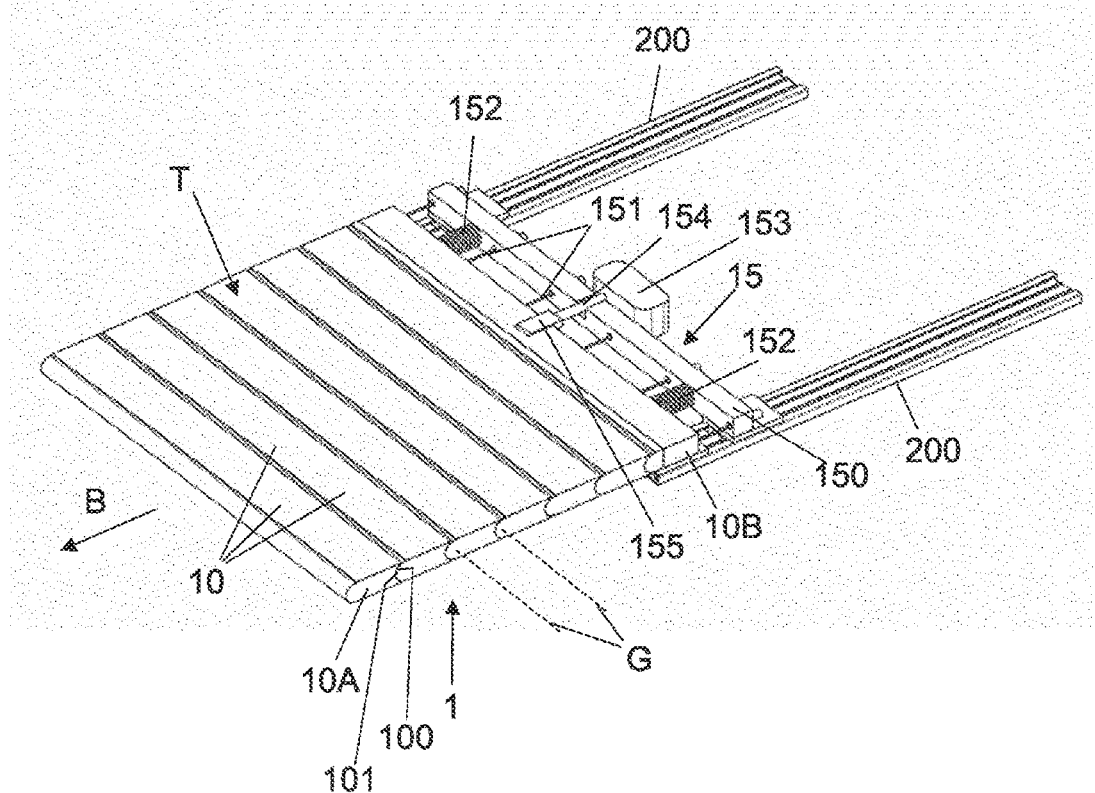

SHELF ARRANGEMENT FOR A VEHICLE

CROSS-REFERENCE TO RELATED APPLICATIONS

This application is the U.S. National Phase of PCT/EP2018/052060 filed Jan. 29, 2018, which claims priority to DE 10 2017 202 625.4 filed Feb. 17, 2017, and DE 10 2017 211 572.6 filed Jul. 6, 2017, the disclosures of which are hereby incorporated in their entirety by reference herein.

TECHNICAL FIELD

The present disclosure relates to a shelf arrangement for a vehicle.

BACKGROUND

Vehicles may include conventional folding tables that may be attached, for example, to a vehicle seat on a rear side of a backrest. These folding tables are not usable simply and advantageously in terms of construction space in the region of a dashboard. There is therefore a need for a solution for a shelf arrangement which firstly may be stowed in an advantageous manner in terms of construction space in a retracted position and secondly forms a load-bearing shelf surface in an extended operational position.

SUMMARY

One or more objects of the present disclosure may be to provide a shelf arrangement for a vehicle that may be used advantageously in terms of construction space such as in the region of a dashboard of a vehicle.

According thereto, the shelf arrangement has a plurality of slat elements, which are accommodated in a retracted position on the vehicle assembly and, for this purpose, are pivotable with respect to one another, wherein the slat elements are movable along a direction of movement with respect to the vehicle assembly in order to transfer the slat elements from the retracted position into an extended position, in which the slat elements are supported on one another in such a manner that the slat elements form the shelf surface.

For example, a shelf arrangement of this type may form a table arrangement. In this case, the shelf surface forms, for example, an at least substantially flat table surface. However, it is also conceivable and possible for the shelf arrangement to form, for example, a shelf for a beverage bottle or another object having a deposition surface which is not flat.

The shelf surface of the shelf arrangement is formed by slat elements which are movable flexibly with respect to one another. Owing to the fact that the shelf arrangement is assembled from slat elements, an arrangement is produced which may optionally be rolled up for stowing in the retracted position, and therefore the shelf arrangement may be accommodated (at least substantially) within the vehicle assembly in a manner advantageous in terms of construction space. For the extension, the slat elements may be moved and moved out of the vehicle assembly in the direction of movement. In an extended position the slat elements form the shelf surface and are supported against one another here in such a manner that the shelf arrangement is sufficiently load-bearing and may therefore serve, for example, as a shelf.

In one refinement, the slat elements are extended transversely with respect to the direction of movement and are formed, for example, by longitudinally extended strips. The slat elements are pivotable with respect to one another here about hinge axes which are extended transversely with respect to the direction of movement.

In a first advantageous embodiment, slat elements may be hinged to one another via hinges. In this case, adjacent slat elements are fixed to one another and held on one another via hinges.

According to an advantageous aspect, adjacent slat elements are releasable here from one another at the hinges, which may improve the handling of the shelf arrangement. The releasability of the hinges thus makes it possible for slat elements to be able to be separated from one another, in the event of excessively large loading, without an irreversible breakage occurring at the slat elements. By reproduction of the hinged joint at the hinges, the shelf arrangement may then be transferred in turn into an operational state, which may take place, for example, automatically during the retraction of the shelf arrangement into the vehicle assembly.

In the extended position, the slat elements are supported on one another in such a manner that they form the shelf surface. In the extended position, at least some of the slat elements are extended freely from the vehicle assembly and may be exclusively supported by one another here, but not in each case on a guide rail. The shelf surface formed by the slat elements therefore extends freely from the vehicle assembly with the slat elements being supported on one another.

In order to provide such a support, the slat elements each have, for example, at least one stop surface which is offset in particular perpendicularly with respect to the hinge axes. In the extended position, the stop surfaces of adjacent slat elements lie against one another, and therefore the slat elements are supported on one another via the stop surfaces, and torques which act in the loading direction on the hinge located between the adjacent slat elements may therefore be absorbed and dissipated via the stop surfaces. The slat elements are therefore held in position with respect to one another by contact of the stop surfaces, and therefore a suitable shelf surface is formed.

In order to incline the shelf surface at an angle in the direction of travel, the stop surfaces of different slat elements may differ in design. For example, it is thus conceivable for the slat elements which are extended last to likewise have fixed stop surfaces which, however, are extended at an angle unequal to 90° in relation to the direction of movement of the slat element. If a contact surface of such a slat element is located outside the guide rail, the adjoining slat elements are at angle to one another. The angle difference of the stop surfaces of up to 90° at a plurality of slat elements therefore adds up to give the overall angle of inclination of the shelf surface formed by (the remaining) slat elements.

In one refinement, the slat elements each have at least one guide link. For example, the slat elements may each have two guide links which are arranged at the ends of the respective slat element and, for example, produce the hinged joint with adjacent slat elements. Via the guide links, the slat elements may be guided, for example, on a guide rail of the vehicle assembly, wherein the guide links may be extended out of the guide rail in order to extend the shelf arrangement and may be retracted again into the guide rail in order to retract the shelf arrangement.

The guide links may form the hinges between respectively adjacent slat elements. One guide link here may have a first hinge element on a first side and a second hinge element on a second side facing away from the first side. Via the first hinge element, the guide link may be connected to a second hinge element of an adjacent slat element arranged on the first side, whereas, via the second hinge element, the guide link may be coupled to a first hinge element of an adjacent slat element arranged on the second side.

The guide links of (most) the slat elements may be structurally identical. Each guide link has a first hinge element and a second hinge element which make it possible to couple adjacent slat elements so that they are hinged to one another and releasable from one another.

The hinge elements may be formed for example firstly by a hinge pin and secondly by a hinge socket, in which the hinge pin of the other hinge element may engage. The associated hinge elements may therefore be plugged into one another and, in the plugged state, are hinged to one another, wherein the hinged joint may be released by removing the hinge elements from one another. For this purpose, the hinge elements may be provided, for example, with sufficient elasticity, for example in the hinge socket, and therefore the hinge elements may be reversibly disengaged.

In one refinement, the slat elements are pretensioned with respect to one another via a tensioning element, for example in the form of an elastic element, for example a rubber cable or rubber band. This has in particular the advantage that, if the hinged joint between two adjacent slat elements is released, the slat elements do not completely fall apart from one another, but rather are held together at least via the tensioning element. This makes it possible, by retraction of the slat elements into the retracted position, to reproduce the hinged joint between released slat elements by a released slat element being pulled along during the retraction because of the action of the tensioning element and automatically entering again into hinged engagement with an adjacent slat element when the slat elements are pulled, for example, into a guide rail.

In one advantageous refinement, the tensioning element is offset perpendicularly with respect to the hinge axes of the slat elements. The tensioning element extends in general along the direction of movement on the slat elements, along which the slat elements are movable for the retraction or extension. The hinged axes extend transversely with respect to the direction of movement. Owing to the tensioning element being offset perpendicularly with respect to the hinge axes (i.e. with respect to the plane defined by the direction of movement and the hinge axes), the tensioning element does not extend along a neutral fiber, but rather is offset with respect to the neutral fiber. The neutral fiber corresponds to the line along the direction of movement, along which no change in length occurs during a pivoting movement of the slat elements with respect to one another. Since the tensioning element does not extend along the neutral fiber, a change in length at the tensioning element occurs during a pivoting movement of the slat elements with respect to one another. The tensioning element may be extended here with respect to the slat elements in such a manner that, for example, it counteracts a geometrical change in shape of the shelf surface, which is provided by the slat elements, in the extended position, i.e. it prevents an unintentional rolling up of the slat elements in the extended position.

In particular, the tensioning element may pretension the slat elements against one another in such a manner that stop surfaces of the slat elements are pulled toward one another because of a pretensioning force of the tensioning element and are therefore loaded in the direction of contact with one another. This has the effect that, because of the tensioning action of the tensioning element, the slat elements are held in a defined position with respect to one another, in particular in the extended position, and therefore a change in shape of the shelf surface formed by the slat elements is not readily possible, at any rate not without overcoming the tensioning of the tensioning element.

The tensioning at the tensioning element may be variable, and therefore, for example, during the retraction, the tensioning may be reduced in order to permit the slat elements to roll up as they are being retracted into a guide rail arrangement.

An advantage which is possible by this means consists in that, in the extended position, the slat elements cannot be rolled up without obstruction, as is the case in the retracted position. For this purpose, the tensioning element merely has to be guided on the lower side of the slat elements (below the neutral fiber), corresponding to an outer side of the slat elements when the slat elements are rolled up. In order not to obstruct the retraction and associated rolling up, the tensioning element may be relaxed by an appropriately selected geometry of the guide in the slat elements or else by active engagement of an actuator.

In a second advantageous embodiment, adjacent slat elements are not fixed on one another via a specific hinge with a defined hinge pin, but rather lie flat against one another via contact surfaces in such a manner that the slat elements may be pivoted with respect to one another about (in this case virtual) hinge axes. The flexibility is provided here by appropriate shaping of the contact surfaces, wherein, for this purpose, each slat element may have, for example, a concavely shaped first contact surface on a first side and a convexly shaped second contact surface on a facing-away second side. The first contact surfaces of the slat elements are complementary to the second contact surfaces of the slat elements, and therefore the convexly shaped second contact surface of a slat element may engage in the associated, complementary, concavely shaped first contact surface of an adjacent slat element and a pivotable connection between the slat elements is thereby provided.

In this case, the slat elements are supported with respect to one another in the extended position via the contact surfaces which, for this purpose, may form friction surfaces, for example, and therefore between the slat elements there is a frictional pairing, owing to which there is (static) friction between adjacent slat elements, leading to the slat elements being supported on one another. Owing to the fact that there is therefore (significant) friction between adjacent slat elements, the effect achieved with the shelf arrangement extended is that the slat elements are held in position with respect to one another at least during correct loading of the shelf surface not exceeding a maximum loading.

Alternatively or additionally, positive-locking elements, for example in the form of a toothing portion or the like, may be provided on the contact surfaces, the positive-locking elements bringing about a support between the slat elements when the shelf arrangement is extended.

In one refinement, the shelf arrangement has a tensioning element which braces the slat elements against one another. The support on the contact surfaces of the slat elements is set via the tensioning element, wherein, for example, the (static) friction at the contact surfaces may be predetermined via the tensioning element by setting the tensioning force or positive-locking elements on the contact surfaces may be brought into engagement with one another or disengaged by action of the tensioning element.

The tensioning at the tensioning element may be varied during movement of the slat elements of the shelf arrangement, and therefore, for example, during the extension of the slat elements, the tensioning at the tensioning element and therefore between the slat elements is automatically increased. For this purpose, the tensioning element may be configured, for example, elastically, and therefore, when the slat elements are extended, an elastic tensioning is brought about at the tensioning element. Alternatively, the tensioning element, for example realized by a Bowden cable, may be guided in such a manner that, in the extended position, a lengthening of the tensioning element (e.g. of the core of a Bowden cable in relation to the Bowden sheath) and, as a result, increased tensioning at the tensioning element are brought about. The tensioning at the tensioning element may be changed via a tensioning device. The effect which may be achieved by this is that the supporting forces acting on the contact surfaces may be varied and set in order, firstly, to provide a load-bearing shelf surface in the extended position of the shelf arrangement, but, secondly, in order to permit a change in the shape of the shelf surface and, when the shelf arrangement is retracted, to permit the slat elements to pivot with respect to one another such that the slat elements may be stowed within the vehicle assembly in a manner advantageous in terms of construction space.

Such a tensioning device may be configured in an entirely different manner and acts on the tensioning element in order to predetermine the tensile forces acting on the tensioning element. The tensioning element may be formed, for example, by a cable element, band element or strap element, and may extend, for example, from the tensioning device through openings in the slat elements to an end, final slat element remote from the tensioning device. By a change in the tensioning force at the tensioning element, the pretensioning of the slat elements against one another may be set, and therefore, as a result, firstly sufficient support between the slat elements in the extended position may be achieved and secondly pivotability between the slat elements may be provided.

The changeability of the tensioning action permits different operating variants.

For example, a suitable sensor arrangement on one or more slat elements or else on a further assembly independent of the shelf arrangement may be provided so that a setting preference of a user may be identified. If a setting preference is identified, the support between the slat elements may be reduced, and therefore a user may change the shape of the shelf surface according to his/her preferences. If the change has taken place, the support may then be increased again by action of the tensioning device such that the shelf surface remains in the set shape.

If the shelf arrangement is intended to be retracted, this may be identified by another suitable sensor arrangement, and therefore, the support between the slat elements is reduced or eliminated during the retraction and the slat elements may be stowed in a flexible manner.

Such a sensor arrangement may contain, for example, one or more capacitive sensors which are arranged on one or more slat elements. Capacitive sensors may be arranged, for example, on a frontmost end slat element. Additionally or alternatively, capacitive sensors may also be arranged on other slat elements. For example, it may be identified by the capacitive sensors that a user is grasping the shelf arrangement with both hands, which may signal that the user would like to adjust the shelf arrangement, and therefore a drive device may be activated, for example in order to retract the shelf arrangement, or a tensioning between slat elements may be reduced, and therefore the user may change the shape of the shelf arrangement.

A crash situation may optionally also be identified by yet another sensor arrangement. If a crash situation is detected, the support between the slat elements may optionally be eliminated, and therefore the shelf arrangement collapses and in particular no longer protrudes, for example, from a dashboard. This may increase the safety in a crash situation.

The adjustment of the slat elements for predetermining the shape of the shelf surface may also take place in an actuated manner by a suitable adjustment device which, for example, acts between adjacent slat elements. For example, electric motors which may adjust slat elements electromotively with respect to one another may act between adjacent slat elements. Alternatively, for example, a cable pull may also act between the slat elements, the cable pull being adjustable via a suitable drive device in order to set a shape of the shelf surface, for example a curved shape.

In one refinement, at least one of the slat elements is guided on a guide rail of the vehicle assembly. The continuous arrangement of the slat elements may be moved along the guide rail in order to transfer the slat elements between the retracted position and an extended position. For example, the guide rail is curved, and therefore the slat elements of the shelf arrangement are guided during the retraction along a curve predetermined by the guide rail and, in the retracted position, are lined up in a row along the curve predetermined by the guide rail.

A curve predetermined by the guide rail may be, for example, in the shape of a spiral, and therefore the slat elements are held compactly with respect to one another in the retracted position.

In one advantageous refinement, the shelf arrangement has two guide rails extended parallel to each other, wherein the slat elements are guided, for example, in the region of a first end in a first of the guide rails and in the region of a second end in a second of the guide rails. The guide rails therefore guide the slat elements between them and supported the slat element.

Irrespective of the configuration and design of the shelf arrangement, the shelf arrangement may include a drive device with a motor and a drive element which is operatively connected to the slat elements. The drive device serves for moving the slat element along the direction of movement and therefore between the retracted position and the (completely) extended position. The shelf arrangement may therefore be adjusted electromotively.

Different refinements of such a drive device are conceivable and possible.

In one refinement, the drive device may interact, for example, via a drive element in the form of a gearwheel with toothing portions in the form of racks on the slat elements. By action on the toothing portions, the slat elements may therefore be moved along the direction of movement between the retracted position and an extended position. The toothing portions of the slat elements are lined up in a row here and together form a rack which is extended along the direction of movement and on which the drive device acts.

The positive-locking engagement of the drive device in the rack formed by the toothing portions of the slat elements may provide a support of the slat elements in the extended position. As one example, the slat elements may be held in their position by the positive-locking engagement of the drive device with the rack formed by the slat elements.

Other drives are also possible, for example a drive in the form of a cable drive using, for example, a Bowden cable or an encircling cable pull, as in the case of a cable-operated window opening mechanism. It is likewise conceivable to use push rods for adjusting the arrangement.

In one refinement, an end portion is arranged on at least one of the slat elements, the end portion being adjustable with respect to the at least one slat element in such a manner that the end portion protrudes perpendicularly with respect to the shelf surface in order to form a stop. Such an end portion may be provided, for example, laterally on a slat element, wherein such end portions may be arranged on both sides of one or more slat elements. Additionally or alternatively, an end portion may also be arranged on a frontmost end slat, on a front end edge of the slat.

Such an end portion may be adjusted in order to provide a stop on the shelf surface, which stop may be configured, for example, in such a manner that slipping down of an object from the shelf surface, in particular during travel of the vehicle, is prevented. Dropping down laterally is prevented by lateral end portions. Dropping down over the frontmost slat may be prevented by an end portion on the end side.

Such end portions may be, for example, hinged to the respectively assigned slat element. In an initial position, the end portions are arranged, for example, in alignment with the respectively assigned slat element. The end portions may be raised from such an initial position (by) 90° in order, in a stop position, to protrude vertically from the shelf surface and therefore to provide a stop on the shelf surface.

The adjustment of the end portions may be undertaken manually. Alternatively, a suitable drive device may also be provided, for example, by electric motors on the slat elements, the electric motors bringing about automatic adjustment of the end portions, for example, when a (completely) retracted position is reached.

In a further refinement, an extension portion may be arranged on at least one slat element, the extension portion being adjustable with respect to the at least one slat element for extending the shelf surface along an extension direction directed longitudinally along the slat element. Such an extension portion may be arranged, for example, displaceably on the associated slat element, for example accommodated in an opening provided longitudinally for this purpose in the slat element. Alternatively, such an extension portion may also be hinged to the slat element in order, by pivoting through 180°, to be transferred from an initial position into an extending position.

By provision of such extension portions on the slat elements, the shelf surface may be increased in size laterally, i.e. transversely with respect to the direction of movement of the slat elements. The adjustment of the extension portions may be undertaken manually. Alternatively, a suitable drive device may also be provided, the drive device serving for adjusting the extension portions, for example when an extended position is reached.

In another refinement, additionally or alternatively to an extension portion, it is also possible, for example, for an adjustable cup holder or an adjustable hook element to be arranged on a slat element. Such a cup holder or such a hook element, for example for holding an item of clothing or a bag, may be extended, for example, manually or automatically, depending on the position of the shelf arrangement, for example when the fully extended position is reached.

In one refinement, a light element for producing a light is arranged on at least one slat element. Such a light element may be realized, for example, by a light-emitting diode. Such a light element may constitute a spot-type light source on an associated slat element or may be arranged as a light strip on the slat element.

Such a light element may serve firstly for providing an illumination on the shelf surface. Additionally or alternatively, such a light element may also give feedback to a user in order, for example, to signal to the user that the extended position has been reached or that an adjustment preference of the user has been recognized. For this purpose, light elements may be operatively connected to the slat elements, for example with a control device, which is designed to activate the light elements depending on the position of the shelf arrangement or depending on an adjustment preference of a user.

The light elements, activated by the control device, may thus be switched on or switched off, for example, depending on the position of the shelf arrangement. For example, the light elements may be switched on only when the fully extended position is reached. Additionally or alternatively, for example, a light color of the light produced by the light elements may be varied depending on an activation by the control device, and therefore the light elements may be activated for producing, for example, a blue light or a green light depending on the position of the shelf arrangement and/or depending on an adjustment preference of a user.

It is possible, for example, for a slip-preventing surface configuration to be provided on one or more slat elements. Such a slip-preventing configuration may be realized, for example, by a coating of a rubber material or the like on the slat elements. Such a slip-preventing surface configuration may also consist, for example, of a magnetized material which may interact with metallic objects arranged on the shelf surface in order to fix the objects on the shelf surface.

In one refinement, slat elements of the shelf arrangement may be interchangeable, which makes it possible, for example, to individually configure the shelf arrangement by interchanging slats. For example, depending on the user's preference, slats with a touch display, with electric plug-in contacts for charging/data connections, with an interface for a wireless charging/data connection or else with mechanical functions, such as a cup holder or a mounting device, for example, for a mobile telephone, may be used. The shelf arrangement may therefore be individualized depending on a user's preference.

BRIEF DESCRIPTION OF THE DRAWINGS

The concept on which the invention is based will be explained in more detail below with reference to exemplary embodiments illustrated the figures, in which:

FIG. 2C shows a separate view of the chain of guide links, in the partially extended position;

FIG. 3C shows a separate view of the chain of the guide links, in the retracted position;

FIG. 6 shows a view of the shelf arrangement according to FIGS. 5A to 5C, illustrating a tensioning device for tensioning the slat elements of the shelf arrangement against one another;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may include a shelf arrangement that may be arranged, for example, in a region near a dashboard of a vehicle and may be movable with its shelf surface in such a manner that when the shelf surface is in a retracted position, it is not visible, or at least not annoying, for a vehicle occupant. The shelf arrangement may be transferred from a retracted position to an extended position in order, for example, to provide a shelf surface for a vehicle occupant on a vehicle seat, in particular a vehicle front seat.

Figure 3A:
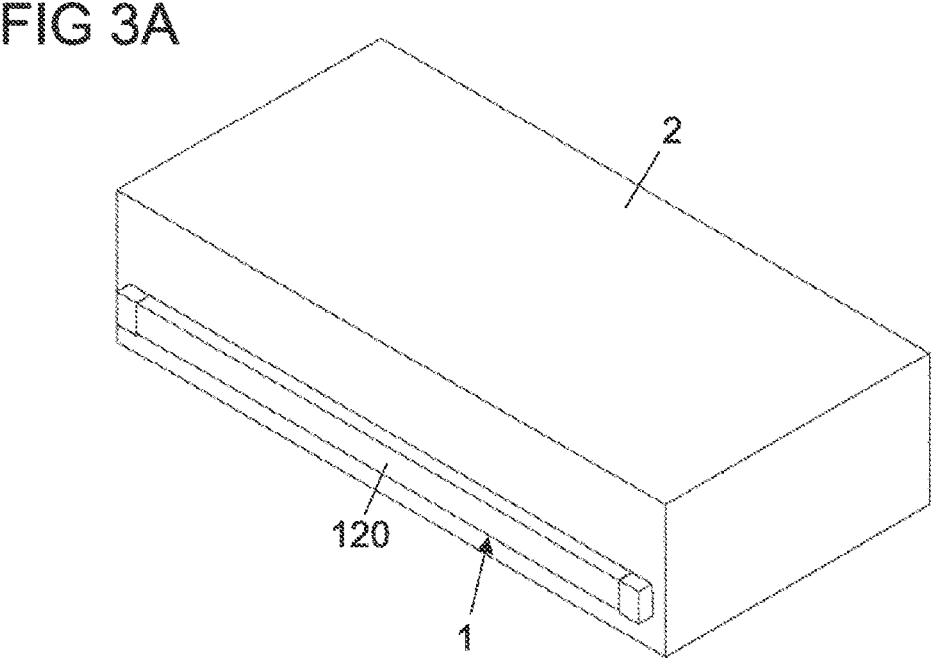
FIG. 3A shows a view of the shelf arrangement in the retracted position.
Figure 3B:
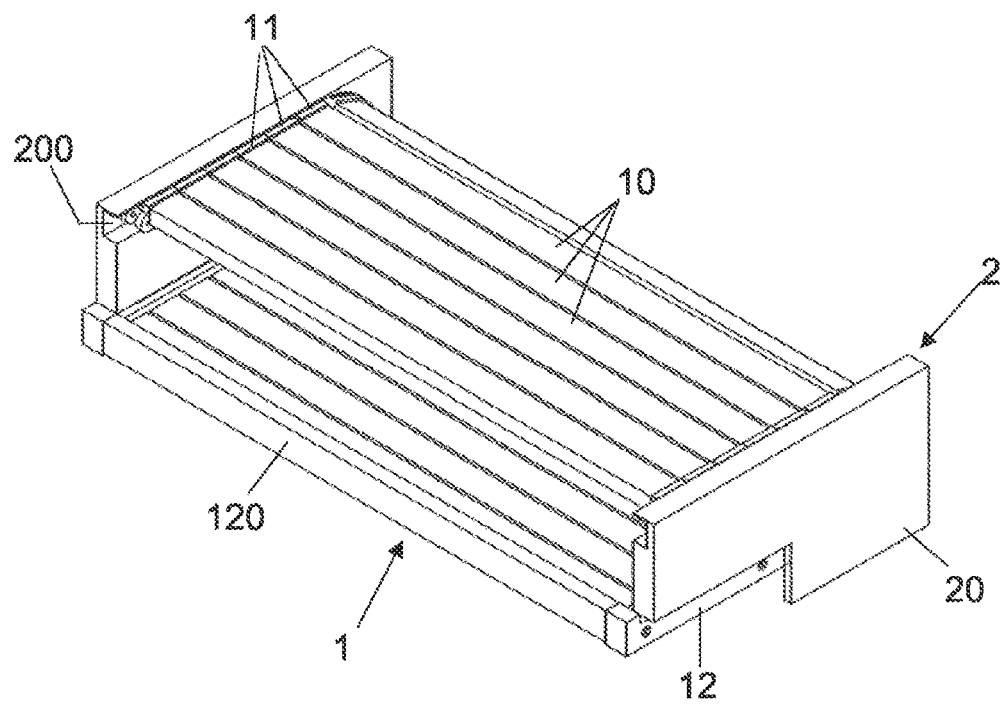
FIG. 3B shows the arrangement according to FIG. 3A, without a housing of the vehicle assembly.

FIGS. 1A-1C to 4A-4C show a first exemplary embodiment of a shelf arrangement 1 which is arranged on a vehicle assembly 2, for example in the form of a dashboard of a vehicle, and may be adjusted along a direction of movement B between an extended position (FIGS. 1A to 1C) and a retracted position (FIGS. 3A to 3C).

The shelf arrangement 1 has a plurality of slat elements 10 which are offset with respect to one another along the direction of movement B, are hinged to one another and are in each case extended longitudinally and, at their two ends, have guide links 11, via which the slat elements 10 are connected to one another about hinge axes G.

In the completely extended position (FIGS. 1A to 1C), the arrangement of the slat elements 10 protrudes from the vehicle assembly 2 without the slat elements 10 being guided via a guide rail or the like outside the vehicle assembly 2. On the contrary, the slat elements 10 form a shelf surface T solely because of being supported on one another, the shelf surface being able to serve as a shelf, for example as a table, within the vehicle.

Figure 4A:
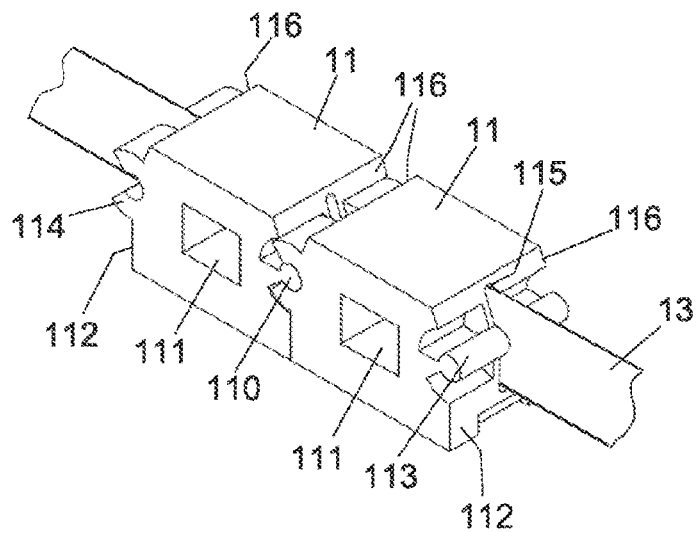
FIG. 4A shows a view of two hinged guide links of two adjacent slat elements.
Figure 4B:
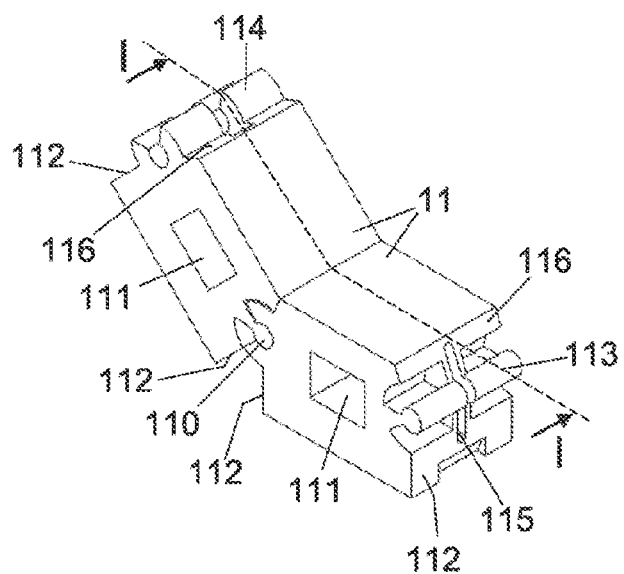
FIG. 4B shows the guide links in a position pivoted with respect to one another.
Figure 4C:
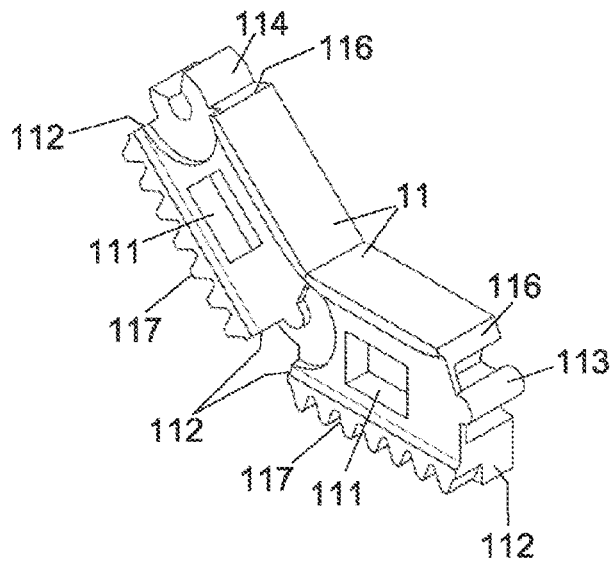
FIG. 4C shows a sectional view along the line I-I according to FIG. 4B.

As is apparent from the separate illustrations according to FIGS. 4A to 4C, the guide links 11 of adjacent slat elements 10 are connected to one another via a hinge 110. The guide links 11 are arranged on strip-shaped bodies of the slat elements 10 via fastening points 111 and, via the latter, are fixedly connected to the slat elements 10.

The guide links 11 of the slat elements 10 (with the exception of the end links 12, apparent from FIGS. 1A to 1C, of an end group of slats) are structurally identical and each have a first hinge element 113 in the form of a hinge pin and, on a side facing away, a second hinge element 114 in the form of a hinge socket. Each guide link 11 may be hinged via the first hinge element 113 to a second hinge element 114 of a guide link 11 of a slat element 10 adjacent thereto and via the second hinge element 114 to a first hinge element 113 of an adjacent slat element 10 arranged on the other side, and therefore a chain of guide links 11 hinging the slat elements 10 to one another is created.

The connection between adjacent guide links 11 may be released here by the first hinge element 113 being able to be released from the second hinge element 114 of the associated adjacent guide link 11. For this purpose, the first hinge element 113 in the form of the hinge socket is sufficiently elastic, and therefore release of the hinge 110 may take place reversibly and the hinge joint may in particular also be reproduced.

The releasability of the hinge 110 reduces the risk of breakage in the event of excessive loading of the shelf arrangement 1 or in the event of incorrect handling. If too heavy an object is arranged on the shelf surface T of the shelf arrangement 1, the connection between two adjacent slat elements 10 may be released without breakage thereby occurring at the hinges 110.

Figure 2A:
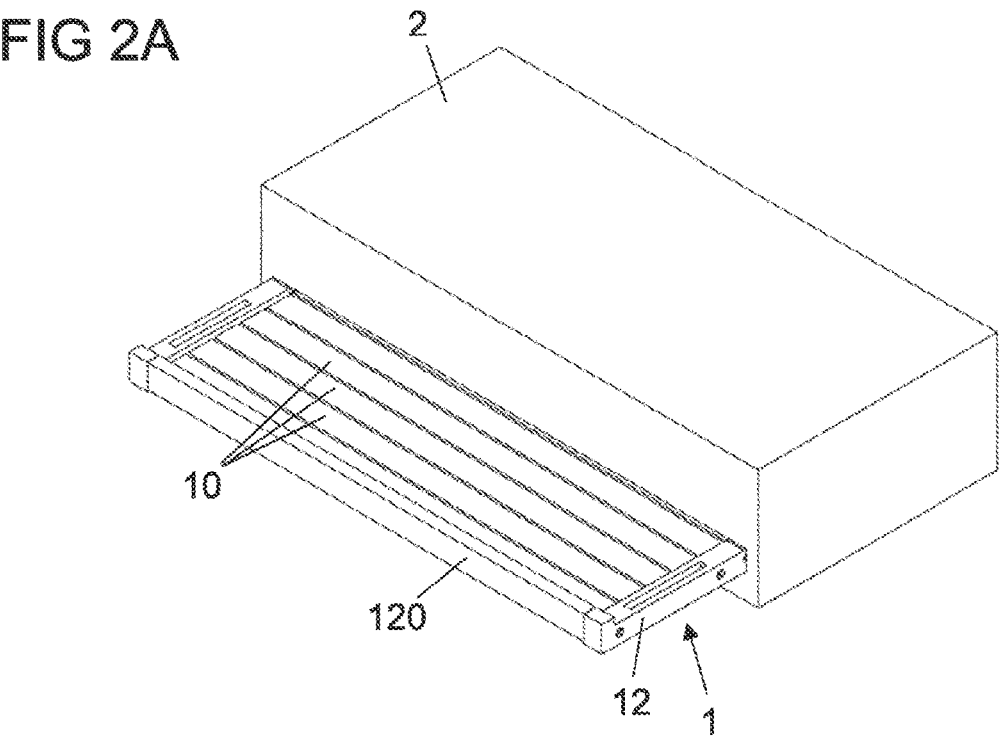
FIG. 2A shows a view of the shelf arrangement in a partially extended position.
Figure 2B:
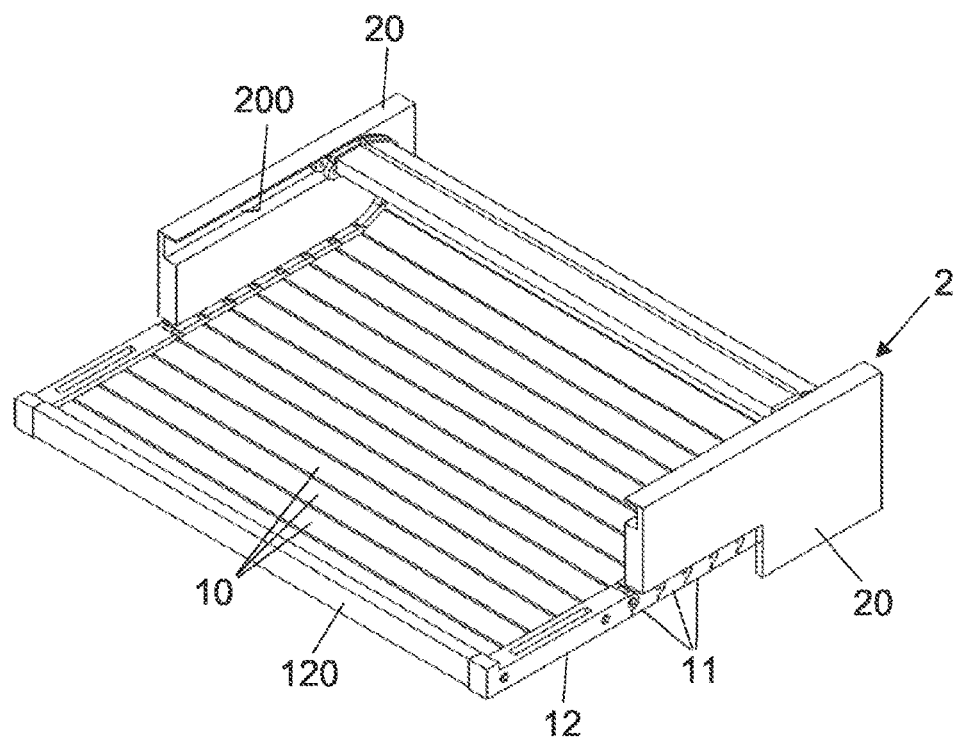
FIG. 2B shows the arrangement according to FIG. 2A, without a housing of the vehicle assembly.

The reproduction of the connection between the slat elements 10 may take place automatically when the shelf arrangement 1 is retracted. A tensioning element 13 for example in the form of an elastic tension element (for example a rubber band), which holds together the arrangement of the slat elements 10, thus extends through openings 115 in the guide links 11. The tensioning element 13 may extend here between an end link 12 (see, for example, FIG. 1B) and a first slat element 10, which is remote from the end link 12, by the vehicle assembly 2 through all of the guide links 11 lined up in a row and may therefore connect the chain of guide links 11 to one another (elastically). If, after a hinge 110 between two adjacent slat elements 10 is released, the arrangement of the slat elements 10 is retracted into the vehicle assembly 2 counter to the direction of movement B, during the retraction because of the tensile action on the tensioning element 13 and by pushing of the guide links 11 into an associated guide rail 200 of an associated housing part 20 of the vehicle assembly 2 (see, for example, FIGS. 2B and 2C), the first hinge element 113 may automatically snap again into engagement with the second hinge element 114 of the associated released guide link 11, and therefore the hinged joint is automatically produced again.

In the retracted position (see FIGS. 3A to 3C), the arrangement of the slat elements 10 is at least substantially enclosed in the vehicle assembly 2. The chains of the guide links 11 on both sides of the slat elements 10 are in each case retracted here into an associated guide rail 200 of an associated housing part 20, wherein the slat elements 10 are pivoted with respect to one another and are thereby stowed advantageously in terms of construction space.

During the extension, the guide links 11, as is apparent from the transition from FIGS. 3A to 3C to FIGS. 1A to 1C, are extended out of the guide rails 200 such that the chains of the guide links 11 in the extended position (FIGS. 1A to 1C) extend freely from the vehicle assembly 2. In the extended position, as is apparent from FIG. 4, stop surfaces 112 are in contact with one another below the hinges 110 of adjacent guide links 11, and therefore the guide links 11 and thus the adjacent associated slat elements 10 are supported on one another by them. In the extended position, a load-bearing shelf surface T is thus created because of the support.

During the retraction, the guide links 11, as is apparent from FIG. 4B, are pivoted with respect to one another at a distance of the stop surfaces 112 from one another, wherein, as a result, other stop surfaces 116, arranged above the hinges 110, of adjacent guide links 11 are brought closer to one another and thus, when the guide links 11 are pivoted to the maximum, there is again a defined support between adjacent guide links 11. Pivoting as in FIG. 4B permits stowing of the shelf arrangement 1 within the vehicle assembly 2 in an advantageous manner in terms of construction space by slat elements 10 pivoting with respect to one another.

Figure 1A:
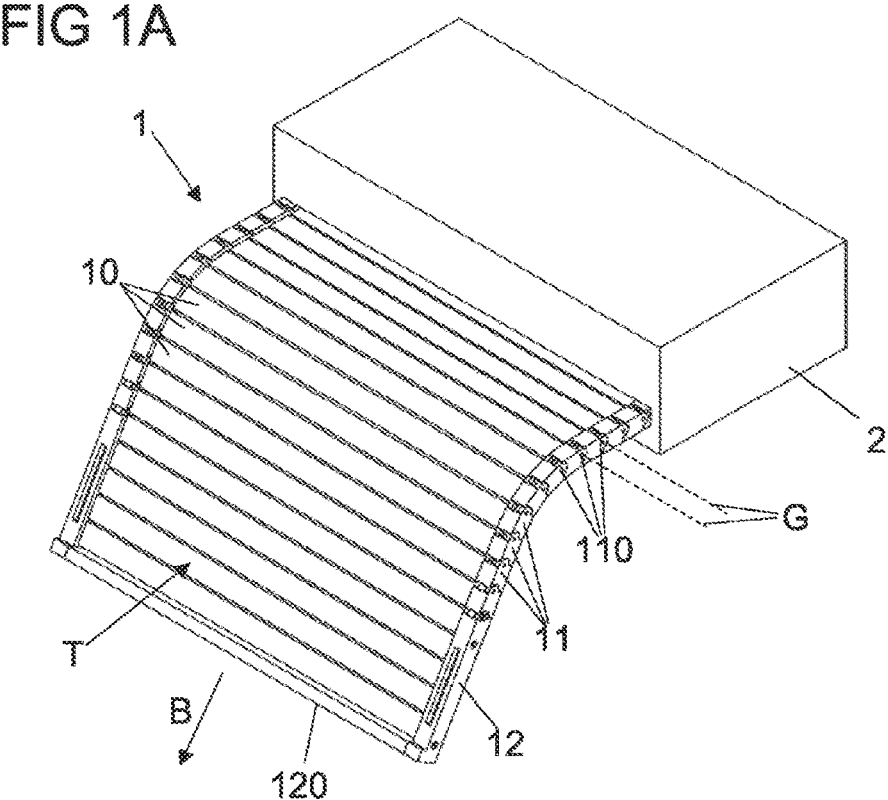
FIG. 1A shows a view of a shelf arrangement in an extended position.
Figure 1B:
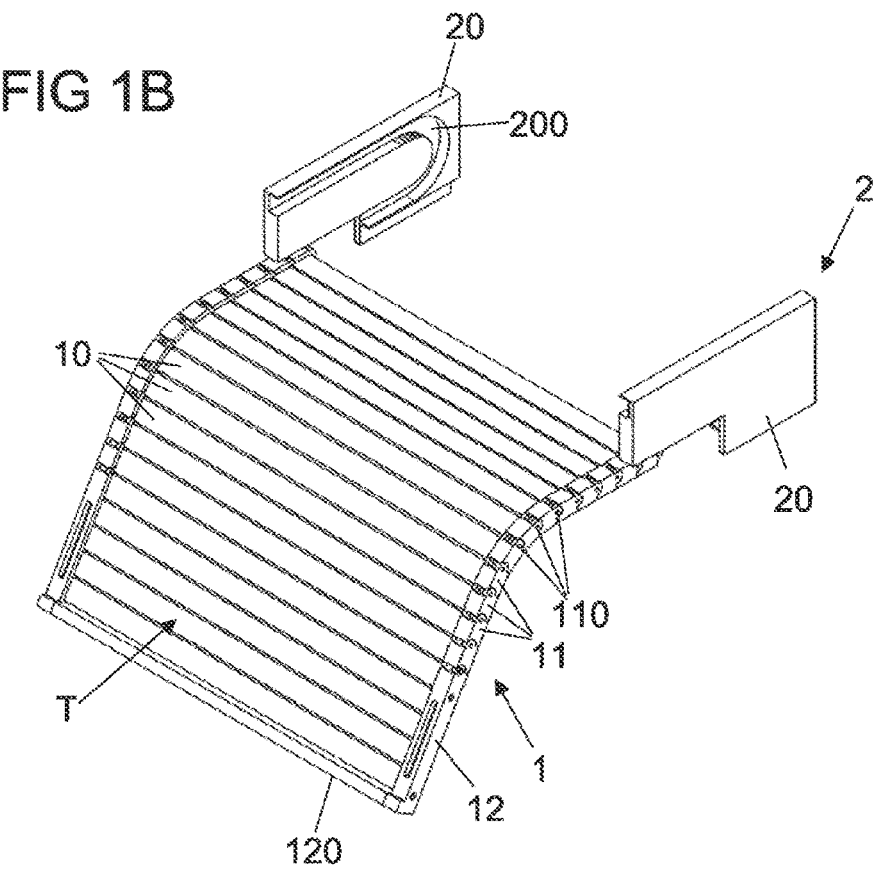
FIG. 1B shows the arrangement according to FIG. 1A, without a housing of a vehicle assembly.
Figure 1C:
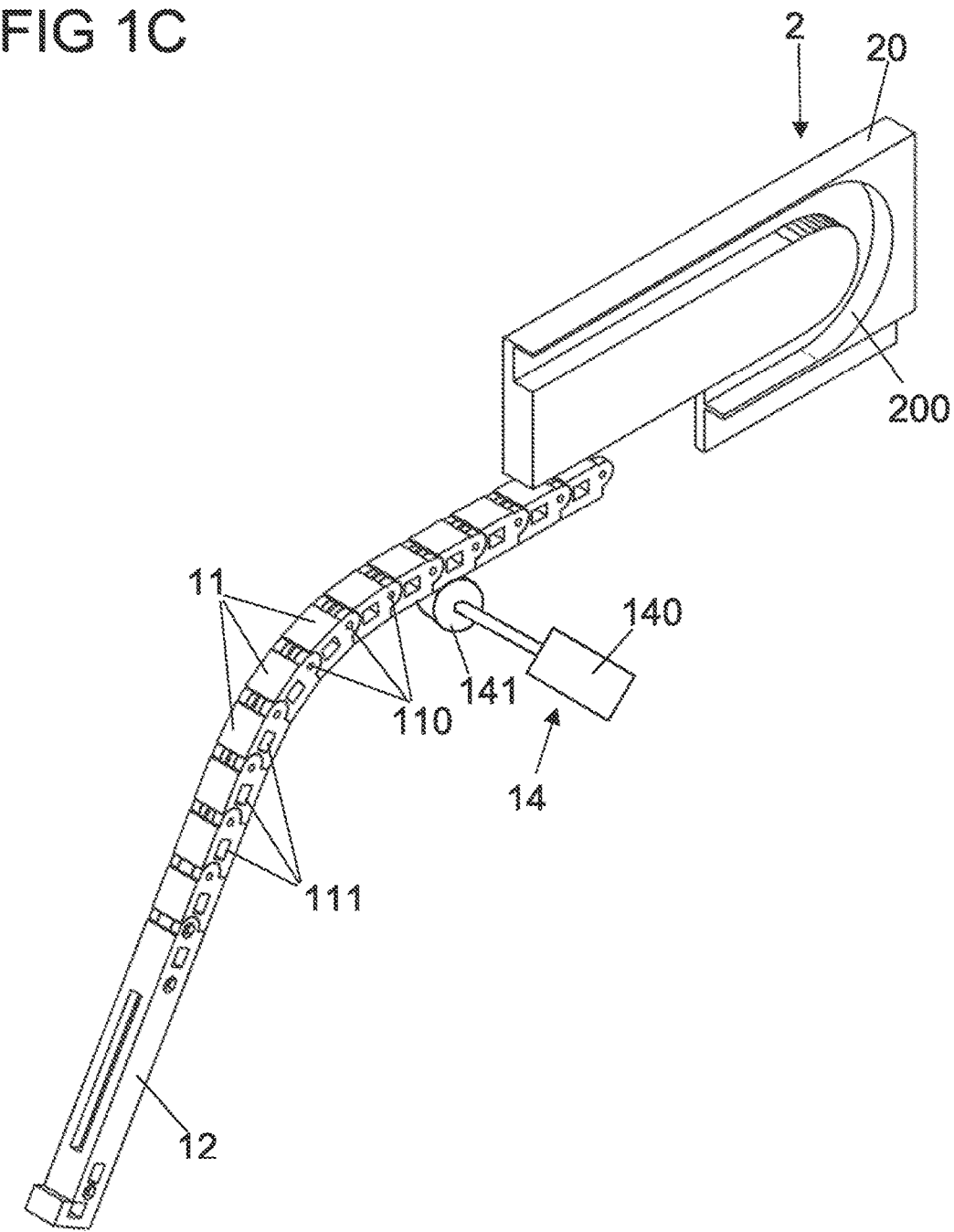
FIG. 1C shows a separate view of a chain of guide links, in an extended position.

The shelf arrangement 1 is adjusted between the retracted position and an extended position via a drive device 14, which is illustrated schematically in FIG. 1C. The drive device 14 may include a motor 140 which drives a drive element 141 in the form of a gearwheel via a motor shaft. The drive element 141 is operatively connected to toothing portions 117 on the lower side of the guide links 11 (see FIG. 4C), and therefore, by rotation of the drive element 141 and by action on the toothing portions 117 on the guide rails 11, the shelf arrangement 1 may be adjusted along the direction of movement B.

For the adjustment of the slat elements 10, the drive device 14 acts by engagement in the lined-up toothing portions 117 of the guide links 11 of the slat elements 10. In this case, a drive device 14 may be provided in each case on both sides of the slat elements 10, wherein the drive devices 14, for example, may be synchronized electronically with one another. Alternatively, a common drive device 14 may be provided which engages a drive element 141 in each case in the lined-up toothing portions 117 of the guide links 11 on both sides of the slat elements 10, wherein the electric motor 140 may be coupled, for example, via flexible shafts to the drive elements 141 in the form of the gearwheels.

The drive device 14 serves firstly for adjusting the slat elements 10 to move between the retracted position and an extended position. In addition, because of the positive-locking engagement of the drive element 141 in the rack formed by the lined-up toothing portions 117, the drive device 14 keeps the slat elements 10 in position in the extended position and therefore supports same firstly against retraction and, in addition, optionally also in relation to a loading downward.

Extension of the slat elements 10 causes the stop surfaces 112 on the guide rails 11 to automatically bear against one another because of the action of gravity and because of the action of the tensioning element 13, and therefore a shelf surface T which is flat at least in sections (see FIG. 1A) is created which may serve, for example, as a table in a vehicle. The pivoting of the slat elements 10 during the retraction operation also takes place automatically by pushing of the guide links 11 into the associated guide rails 200.

The drive device 14 may be actuated, for example, via a suitable user-operable control device.

FIGS. 5A-5C and 6 show a second exemplary embodiment of a shelf arrangement 1, in which, in turn, slat elements 10 are connected pivotably to one another about hinge axes G and may be adjusted between a retracted position and an extended position with respect to a vehicle assembly 2, for example in the form of a dashboard of a vehicle.

In the exemplary embodiment according to FIGS. 5A-5C and 6, the slat elements 10 are held on one another and connected to one another via an arrangement of tensioning elements 151 of a tensioning device 15, as illustrated in FIG. 6. Adjacent slat elements 10 lie against one another here via contact surfaces 100, 101, wherein each slat element 10 has a first, concavely curved contact surface 100 and a second, convexly curved contact surface 101, which contact surfaces are each in contact with a complementary contact surface of an adjacent slat element 10. The first contact surface 100 of a slat element 10 is in engagement here with an associated second contact surface 101 of an adjacent slat element 10, while the second contact surface 101 is in engagement with an associated first contact surface 100 of the slat element 10 which is adjacent in the other direction.

By means of flat contact of the contact surfaces 100, 101 of adjacent slat elements 10 against one another, the slat elements 10 are mounted pivotably with respect to one another and are movable with respect to one another about (virtual) hinge axes G.

The pivotable arrangement of the slat elements 10 on one another firstly permits stowing of the slat elements 10 in the retracted position in an advantageous manner in terms of construction space. In addition, in the extended position, the slat elements 10 may be positioned differently with respect to one another in order to create a shelf surface desired by a user.

The tensioning device 15 serves to set pretensioning between the slat elements 10. A plurality of tensioning elements 151 in the form, for example, of tension cables extends from a strip element 150 through the slat elements 10 as far as an end slat element 10A, to which the tensioning elements 151 are fixedly connected. The distance between the strip element 150 and a first slat element 10B facing the strip element 150 may be set via a tensioning device 153 which, in the exemplary embodiment illustrated, has a rotatable spindle 154, which is in engagement with a spindle nut 155 on the first slat element 10B, and, by rotation of the spindle 154, permits a variable setting of the distance between the strip element 150 and the first slat element 10B.

Furthermore, two spring elements 152 act between the strip element 150 and the first slat element 10B, but the spring elements, in the exemplary embodiment illustrated, serve primarily for damping the tensioning movement and are very substantially ineffective in the tensioned state of the tensioning device 15.

For tensioning the slat elements 10 to one another, the strip element 150 is pushed away from the first slat element 10B via the tensioning device 153, and therefore the tensioning elements 151 in the form, for example, of tension cables are tensioned and the slat elements 10 are pressed alternately into contact with one another via them. Via the contact surfaces 100, 101, which may be designed, for example, as friction surfaces for setting a friction pairing, there is therefore (sufficient) (static) friction between the contact surfaces 100, 101 such that the slat elements 10 are held in position with respect to one another and the shelf arrangement 1 therefore forms a load-bearing shelf surface, for example, for the depositing of an object, and being, for example, in the form of a table.

During the retraction of the shelf arrangement 1, the tension is reduced by the strip element 150 and the first slat element 10B being brought closer to one another (counter to the action of the spring elements 152), and therefore the contact pressure between adjacent slat elements 10 is reduced and therefore the supporting action between adjacent slat elements 10 is also reduced. The slat elements 10 may therefore be retracted and wound up for example, for stowing within the vehicle assembly 2.

The variable adjustability of the supporting action between the slat elements 10 permits different actuation variants.

Figure 5A:
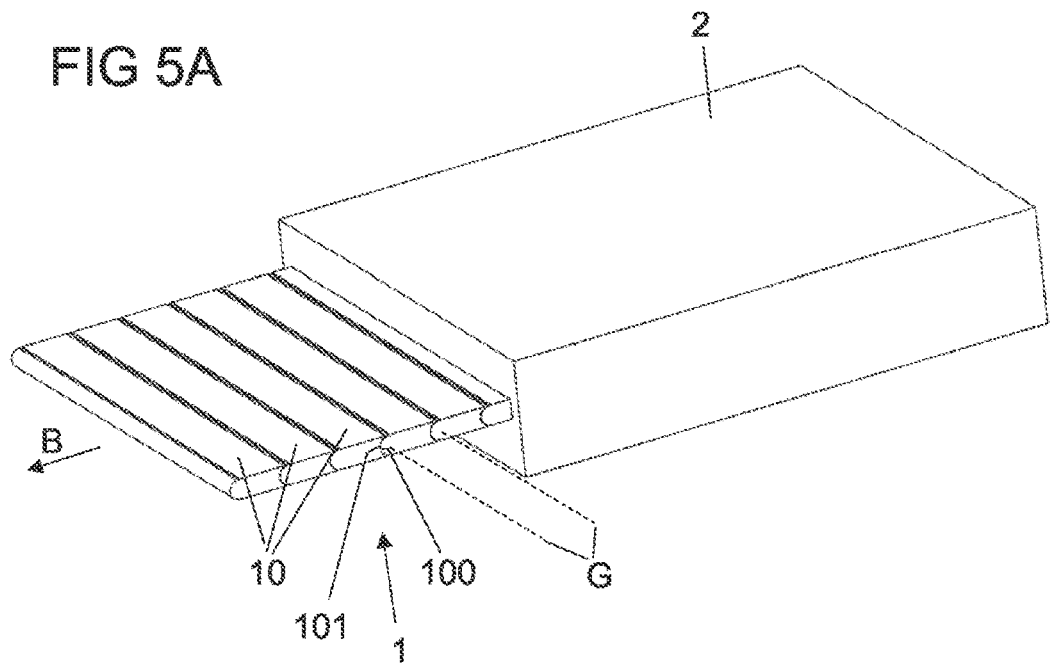
FIG. 5A shows a view of another exemplary embodiment of a shelf arrangement, in an extended position.
Figure 5B:
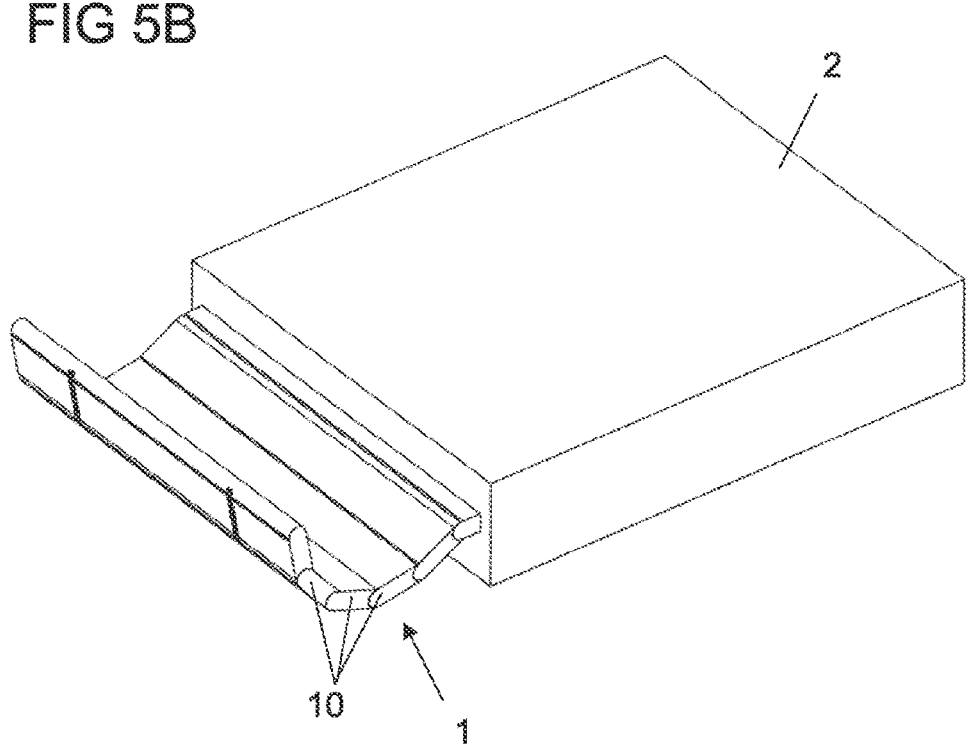
FIG. 5B shows the arrangement according to FIG. 5A, with a differently shaped shelf surface.
Figure 5C:
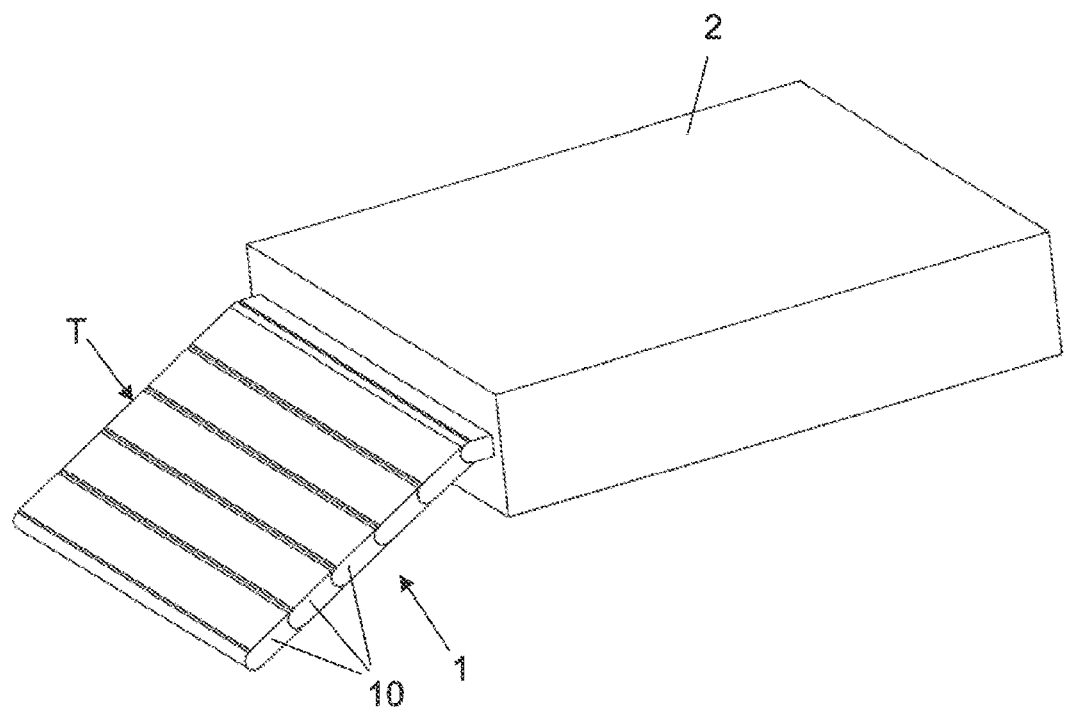
FIG. 5C shows the shelf arrangement, with an again differently shaped shelf surface.

Thus, a suitable sensor arrangement, for example in the form of a capacitive approximation sensor or touch sensor, which may identify an action of a user and an adjustment preference of the user, may be provided on one slat element 10 or else on a plurality of slat elements 10. During a predetermined action gesture, for example action over a predetermined period of time (for example, longer than 5 seconds), for example, the tension between the slat elements 10 may be reduced, and therefore the user may bring the shelf surface created by the slat elements 10 into a desired shape, for example from a flat shape (FIG. 5A) into a curved shape (FIG. 5B) in order, for example, to permit the depositing of a beverage bottle, or into an inclined shape as a reading surface or desk surface (FIG. 5C).

Such a sensor arrangement which may identify an adjustment preference of the user may be arranged on the slat elements 10, but may also be provided separately from the shelf arrangement 1, for example on a housing portion of the vehicle assembly 2.

Additionally or alternatively, collapsing of the shelf arrangement 1 may be brought about if a crash situation is detected by a different sensor arrangement in the vehicle. In a crash situation, the shelf arrangement 1 should be prevented from protruding from the dashboard toward a vehicle occupant and from thereby possibly constituting a danger for the occupant. If a crash is identified, the tension between the slat elements 10 may be reduced, and therefore the shelf arrangement 1 collapses because the slat elements 10 are no longer supported on one another in a positionally fixed manner.

The shelf arrangement 1 is guided on guide rails 200, as is illustrated schematically in FIG. 6, and is thereby movable relative to the vehicle assembly 2 between the completely extended position and the retracted position. During the retraction, for example, the slat elements 10 may be wound up or pivoted in another way with respect to one another in order to permit stowing of the slat elements 10 in a manner advantageous in terms of construction space within the vehicle assembly 2.

The adjustment may electromotively by a suitable drive device, for example again using a drive element in the form of a gearwheel which is in engagement with toothing portions on sides of the lamella elements 10 (as described above for the exemplary embodiment according to FIGS. 1A-1C to 4A-4C), wherein other drives, for example in the form of cable drives (conventional in the case of window opening mechanisms) may also be used.

Instead of contact surfaces 100, 101 in the form of friction surfaces between the slat elements 10 or optionally also additionally thereto, for example positive-locking elements, for example, in the form of toothing portions may also be provided between the slat elements 10, the positive-locking elements being able to bring about support of the slat elements 10 on one another and being able to be brought out of operative engagement by the tensioning between the slat elements 10 being adapted via a suitable tensioning device 15.

In another exemplary embodiment, an additional adjustment device for adjustment by actuator of the position of the slat elements 10 with respect to one another may also be provided, for example in the form of a traction device using a traction cable or the like.

Figure 7:
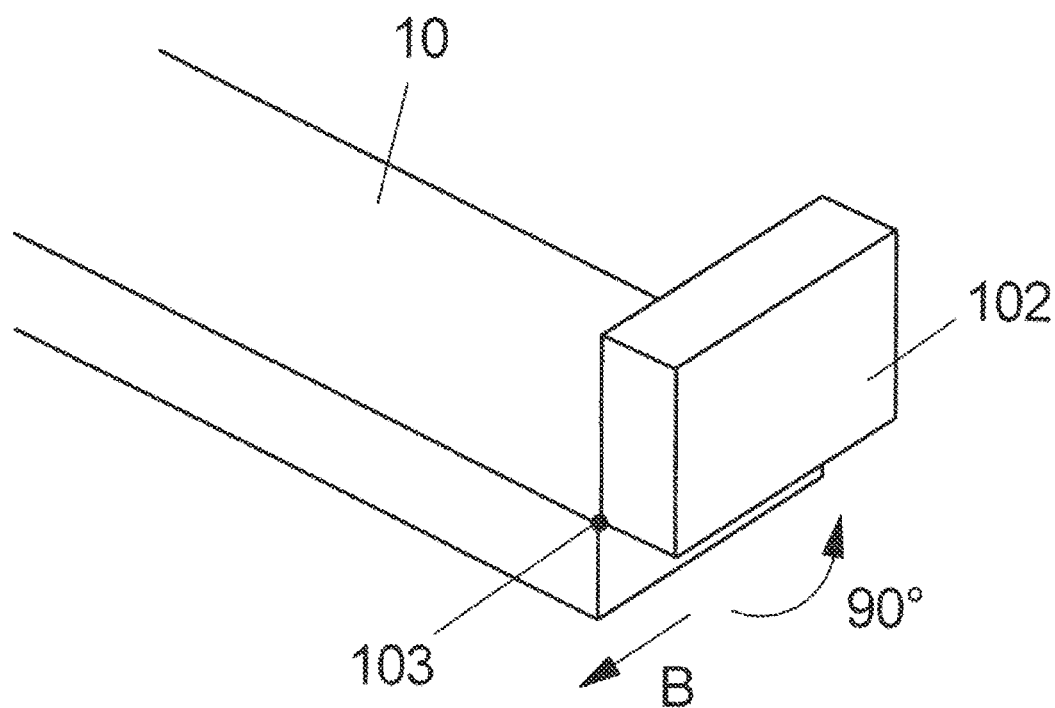
FIG. 7 shows a schematic view of a slat element with an end portion arranged thereon for providing a stop.

FIG. 7 shows a schematic view of a slat element 10 on which an end portion 102 is arranged pivotably about a hinge 103. In an initial position, the end portion 102 is aligned with the slat element 10. From the initial position, the end portion 102 may be pivoted through 90° about the hinge axis provided by the hinge 103 and may therefore be raised in relation to the slat element 10 in order to provide a stop laterally on the slat element 10, the stop being able to prevent objects from slipping down from the shelf surface T created by slat elements 10.

Such an end portion 102 may be provided on the slat elements 10 both in the exemplary embodiment according to FIGS. 1-4 and in the exemplary embodiment according to FIGS. 5 and 6 and may be arranged on both sides of each slat element 10 or only on individual slat elements 10. Such an end portion 102 may additionally also be provided on an end slat element 10A and may be arranged, for example, on an end edge of the slat element 10A in order to provide an end stop for preventing an object from dropping down from the shelf surface T over the end slat element 10A.

Such an end portion 102 may be adjusted manually by a user in an extended position of the shelf arrangement 1. Alternatively, such an end portion 102 may also be adjustable by actuator, for example automatically when the fully extended position is reached, using a suitable drive, for example an electric motor acting between the slat element 10 and the end portion 102.

Figure 8:
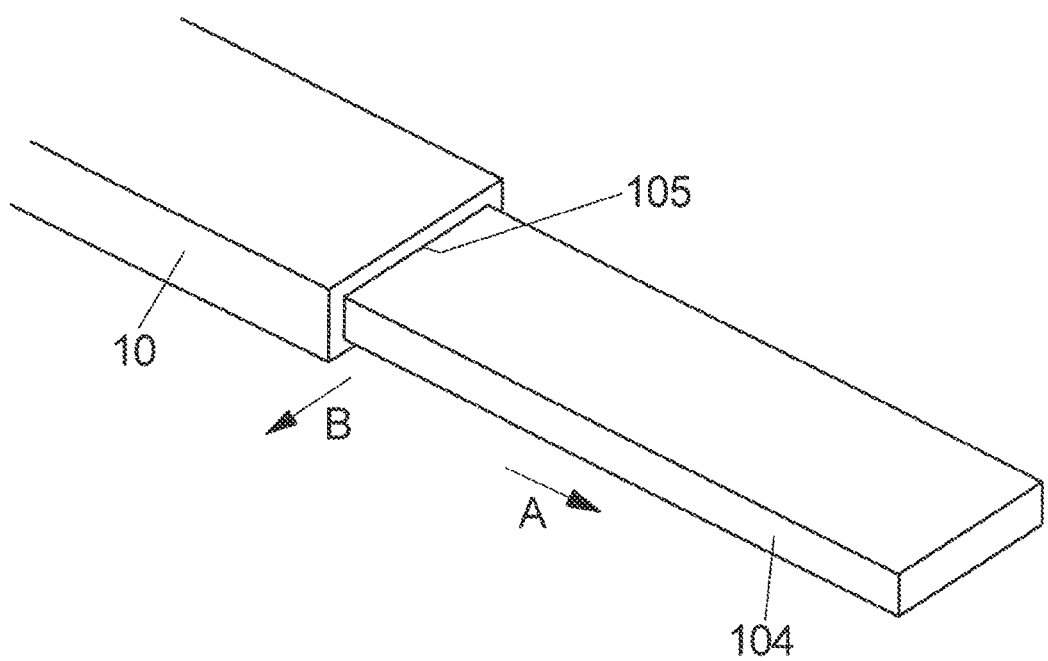
FIG. 8 shows a schematic view of a slat element with an extension portion arranged thereon for extending the provided shelf surface.

In a refinement illustrated in FIG. 8, an extension portion 104 is arranged on a slat element 10, which extension portion is accommodated displaceably in an opening 105 of the slat element 10 and is adjustable along an extension direction A with respect to the slat element 10. With such an extension portion 104, the shelf surface T may be extended transversely with respect to the direction of movement B by the extension portion 104 being pulled out of the slat element 10 in the extension direction A.

Figure 9:
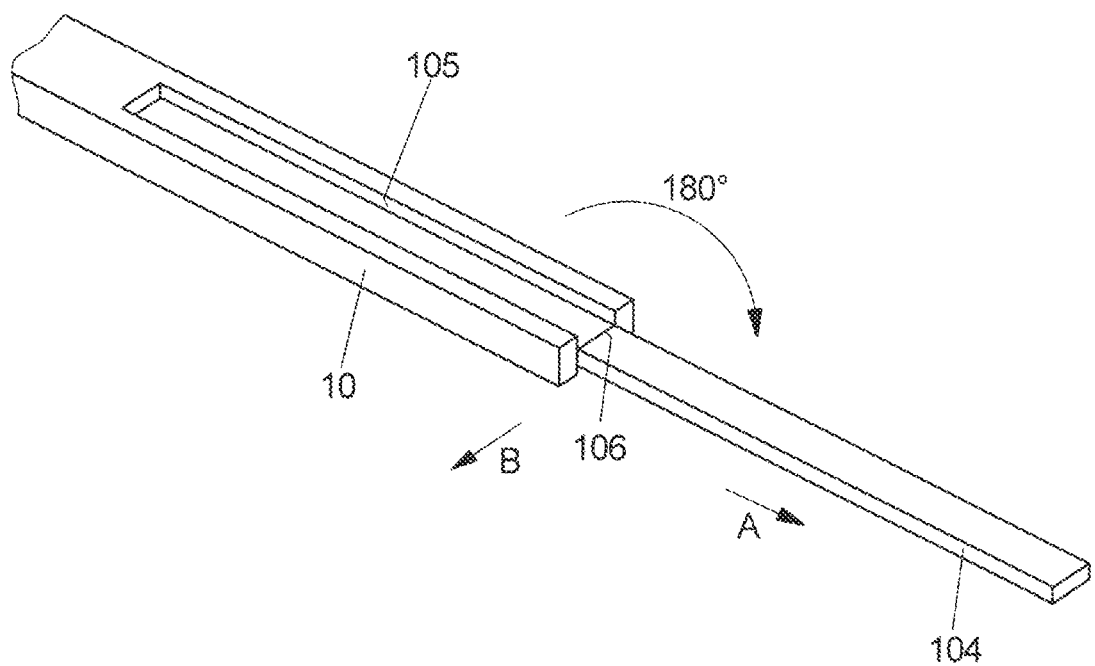
FIG. 9 shows a schematic view of a slat element with a different extension portion.

FIG. 9 shows an alternative refinement of such an extension portion, in which an extension portion 104 is hinged to an associated slat element 10 about a hinge 106. In an initial position, the extension portion 104 is accommodated in a recess 105 of the slat element 10. The extension portion 104 may be pivoted out of the initial position by the extension portion 104 being adjusted through 180° about the hinge 106 with respect to the slat element 10 and therefore extending the slat element 10 laterally along the extension direction A.

Such extension portions 104 may be seen on one side or on both sides of each slat element 10.

Such extension portions 104 may be adjusted manually by a user in order to extend the shelf surface T laterally in the completely extended position. Alternatively, suitable actuator drives may also be provided in order to adjust the extension portions 104, for example electromotively, with respect to the slat elements 10 when the fully extended position is reached.

Figure 10:
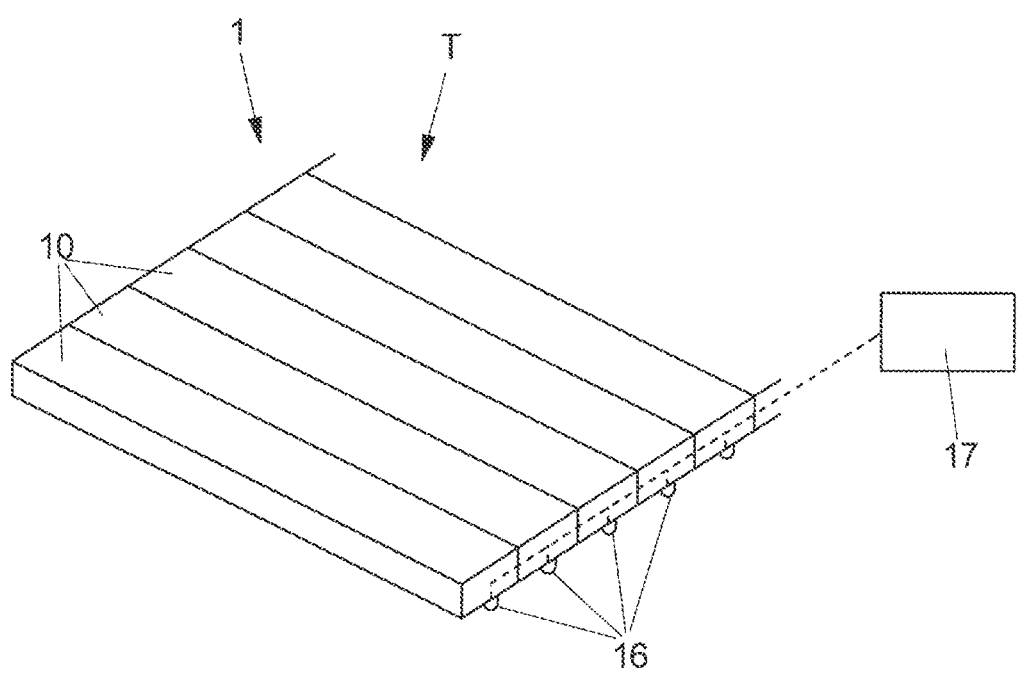
FIG. 10 shows a schematic view of the shelf arrangement with light elements arranged on slat elements.

In a refinement illustrated in FIG. 10, light elements 16 which serve to produce a light on the shelf surface T of the shelf arrangement 1 are arranged on one or more slat elements 10.

Such light elements 16 may be arranged on the shelf surface T, for example on the upper side of the slat elements 10. Additionally, or alternatively, such light elements 16 may also be arranged, as illustrated, on the lower side of the slat elements 10 in order to produce a light downward or on lateral end edges.

The light elements 16 are realized, for example, by light-emitting diodes or the like. The light elements 16 may realize spot-type light beams or else may be configured as light strips which extend longitudinally or transversely with respect to the slat elements 10.

The light elements 16 may be connected, for example, to a control device 17 which serves for activating the light elements 16 in order to produce a light. The control device 17 may activate the light elements 16 here, for example depending on the position of the shelf arrangement 1, and therefore the light elements 16 are automatically switched on (energized), for example when an extended position is reached.

Additionally or alternatively, feedback may be given to a user via the light elements 16 by the light produced by the light elements 16 being changed depending on the position of the shelf arrangement 1 or depending on an adjustment preference signaled by a user. It may thus be signaled to a user, for example by changing the color of the light produced by the light elements 16, that an adjustment preference has been identified, for example when an action of the user on the shelf arrangement 1 for changing the shape of the shelf surface T is identified, and the user may has been then manually adapt the shape of the shelf surface T by changing the position of the slat elements 10 with respect to one another.

The concept is not restricted to the above-described exemplary embodiments, but may also be realized in an entirely different way.

A shelf arrangement of the type described here may very generally provide a shelf in a vehicle for depositing an object, or as a rest, for example for reading or writing for a user. A shelf arrangement of the type described here may be used, for example, as a table in a vehicle, wherein such a shelf arrangement may be arranged, for example, on a dashboard of a vehicle or else at a different location in a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

1 Shelf arrangement (table arrangement)
10, 10A, 10B Slat elements
100, 101 Contact surfaces (friction surfaces)
102 End portion
103 Hinge
104 Extension element
105 Opening
106 Hinge
11 Guide links
110 Hinge
111 Fastening point
112 Stop surface
113 Hinge element
114 Hinge element
115 Opening
116 Stop surface
117 Toothing portion
12 End link
120 End strip
13 Tensioning element
14 Drive device
140 Motor
141 Drive element (gearwheel)
15 Tensioning assembly
150 Strip element
151 Tensioning element
152 Spring element
153 Tensioning device
154 Spindle
155 Spindle nut
16 Light elements
17 Control device
2 Vehicle assembly
20 Housing part
200 Guide rail
A Extension direction
B Direction of movement
G Hinge axis
T Shelf surface

The invention claimed is:

1. A shelf arrangement for use in a vehicle configured to form a shelf surface and adjustable with respect to a vehicle assembly, the shelf arrangement comprising:
 a plurality of slat elements including a first slat element and a second slat element each pivotable with respect to one another and each configured to move along a direction of movement between a retracted position and an extended position, wherein when the first slat element and a second slat element are in the retracted position, the first slat element and a second slat elements are disposed in the vehicle assembly,
 wherein the first slat element includes a guide link including a first hinge element, connected to the first slat, and a second hinge element connected to the second slat,
 wherein the first hinge element is releasably connected to the second hinge element; and
 a tensioning element extending between the first slat element and the second slat element and configured to bias the first slat element towards the second slat element along the direction of movement,
 wherein when the plurality of slat elements are in the extended position, each of the slat element of the slat elements support on one another in such a manner that the slat elements form the shelf surface.

2. The shelf arrangement of claim 1, wherein the plurality of slat elements extend transversely with respect to the direction of movement and are pivotable with respect to one another about hinge axes defined by the first hinge element and the second hinge element and extending transversely with respect to the direction of movement.

3. The shelf arrangement of claim 2, wherein each of the slat elements of the plurality of slat elements are hinged to one another about the hinge axes via hinges.

4. The shelf arrangement of claim 3, wherein the slat elements are releasable from one another at the hinges.

5. The shelf arrangement of claim 3, wherein the slat elements each include at least one stop surface configured to support an adjacent slat element when the plurality of slat elements are in the extended position.

6. The shelf arrangement of claim 2, further comprising a guide rail, wherein the guide link is extendable out of the guide rail in order to extend the shelf arrangement and is retractable into the guide rail in order to retract the shelf arrangement.

7. The shelf arrangement of claim 1, wherein the tensioning element is elastic.

8. The shelf arrangement of claim 7, wherein the tensioning element is offset perpendicularly with respect to the hinge axes of the slat elements.

9. The shelf arrangement of claim 1, wherein the tensioning element-pretensions the first slat element and the second slat element towards one another so that that stop surfaces of the slat elements are pulled toward one another by application of a pretensioning force by the tensioning element.

10. The shelf arrangement of claim 1, further comprising a drive device provided with a motor and a drive element, wherein the drive device is operatively connected to the plurality of slat elements to move the plurality of slat elements along the direction of movement.

11. The shelf arrangement of claim 1, wherein the first slat element includes a toothing portion, wherein an adjustment force applied to the toothing portion moves the first slat element along the direction of movement.

12. The shelf arrangement of claim 1, wherein at least one of the slat elements of the plurality of slat elements includes an end portion, wherein the end portion is adjustable with respect to the at least one slat element so that the end portion protrudes perpendicularly with respect to the shelf surface to form a stop.

13. The shelf arrangement of claim 1, wherein at least one slat element of the plurality of slat elements includes an extension portion, wherein the extension portion is adjustable with respect to the at least one slat element to extend the shelf surface along an extension direction extending longitudinally along the slat element.

14. The shelf arrangement of claim 1, further comprising a light element configured to produce a light on at least one slat element of the plurality of slat elements.

15. The shelf arrangement of claim 14, further comprising a control device, wherein the control device is configured to activate the light element based on a position of the shelf arrangement and/or an adjustment preference of a user.

16. A shelf arrangement for use in a vehicle configured to form a shelf surface and adjustable with respect to a vehicle assembly, the shelf arrangement comprising:
a plurality of slat elements movable along a direction of movement with respect to the vehicle assembly to move the plurality of slat elements from a retracted position to an extended position and extending transversely with respect to the direction of movement; and
a tensioning element extending through a first slat element and a second slat element of the plurality of slat elements and configured to brace the first slat element and the second slat element against one another,
wherein the first slat element and the second slat element each include contact surfaces configured to lie flat against one another and hinge axes extending transversely to the direction of movement, so that the first slat element and the second slat element are pivotable with respect to one another about the hinge axes,
wherein when the plurality of slat elements are in the retracted position, the plurality of slat elements are disposed in the vehicle assembly, and
wherein the plurality of slat elements extend transversely with respect to the direction of movement and support one another such that the slat elements form the shelf surface.

17. The shelf arrangement of claim 16, wherein the first slat element includes a concavely shaped first contact surface on a first side of the first slat element and a convexly shaped second contact surface on a second side of the first slat element.

18. The shelf arrangement of claim 16, wherein when the plurality of slat elements are in the extended position, the contact surfaces of the first slat element and the second slat element elements lie frictionally against one another in order to support one another to form the shelf surface.

19. The shelf arrangement of claim 16, further comprising a tensioning device configured to vary tension of the tensioning element.

20. The shelf arrangement of claim 16, wherein the tensioning element is formed by a cable element, a band element or a strap element.

21. The shelf arrangement of claim 20, further comprising a guide rail disposed in the vehicle assembly, wherein the first slat element is guided by the guide rail of the vehicle assembly.

22. A shelf arrangement for use in a vehicle configured to form a shelf surface and adjustable with respect to a vehicle assembly, the shelf arrangement comprising:
a plurality of slat elements pivotable with respect to one another to move to a retracted position such that the plurality of slat elements are disposed in the vehicle assembly,
wherein a number of slat elements of the plurality of slat elements include a toothing portion configured to be engaged by a gear so that as the gear rotates, the number of slat elements move along a direction of movement with respect to the vehicle assembly from the retracted position to an extended position, and
wherein the plurality of slat elements support one another in such a manner that the slat elements form the shelf surface.

* * * * *